US007865095B2

(12) United States Patent
Kakutani

(10) Patent No.: US 7,865,095 B2
(45) Date of Patent: Jan. 4, 2011

(54) IMAGE FORMING APPARATUS INCLUDING DISTANCE DETECTION UNIT

(75) Inventor: Toshifumi Kakutani, Toride (JP)

(73) Assignee: Canon Kabushiki Kaisha (JP)

( * ) Notice: Subject to any disclaimer, the term of this patent is extended or adjusted under 35 U.S.C. 154(b) by 192 days.

(21) Appl. No.: 12/185,951

(22) Filed: Aug. 5, 2008

(65) Prior Publication Data

US 2009/0041493 A1 Feb. 12, 2009

(30) Foreign Application Priority Data

Aug. 7, 2007 (JP) ............................ 2007-205509

(51) Int. Cl.
*G03G 15/00* (2006.01)
*G03G 15/01* (2006.01)
*B41J 2/385* (2006.01)
*G01D 15/06* (2006.01)

(52) U.S. Cl. .......................... 399/49; 399/301; 347/116

(58) Field of Classification Search .................. 399/49, 399/60, 73, 301; 347/116
See application file for complete search history.

(56) References Cited

U.S. PATENT DOCUMENTS 5,253,018 A * 10/1993 Takeuchi et al. .............. 399/49
6,904,245 B2 * 6/2005 Mochizuki et al. ............ 399/49
6,909,858 B2 * 6/2005 Hama et al. .................... 399/49
7,133,056 B2 * 11/2006 Tanaka et al. ............... 347/116

FOREIGN PATENT DOCUMENTS

JP 11-237773 A 8/1993

* cited by examiner

*Primary Examiner*—Sandra L Brase
(74) *Attorney, Agent, or Firm*—Rossi, Kimms & McDowell LLP

(57) ABSTRACT

An image forming apparatus including a patch detection sensor for detecting an intermediate transfer belt and image information of toner images transferred onto the intermediate transfer belt, a distance measurement sensor for detecting the distance between a light emitting portion of the patch detection sensor and the surface of the intermediate transfer belt facing the patch detection sensor, and a control unit for correcting the image information detected by the patch detection sensor based on the distance information detected by the distance measurement sensor and controlling image forming conditions so as to correct at least one of density and color misregistration of toner images based on the corrected image information.

15 Claims, 14 Drawing Sheets

FIG. 9A

PATCH DETECTION SENSOR DISTANCE-OUTPUT TABLE

| DISTANCE (mm) | OUTPUT (h) |
|---|---|
| 5.5 | 121 |
| 5.6 | 127 |
| 5.7 | 131 |
| 5.8 | 134 |
| 5.9 | 138 |
| 6.0 | 139 |
| 6.1 | 138 |
| 6.2 | 135 |
| 6.3 | 131 |
| 6.4 | 127 |
| 6.5 | 121 |

FIG. 9B

DISTANCE MEASUREMENT SENSOR DISTANCE-OUTPUT TABLE

| DISTANCE (mm) | OUTPUT (h) |
|---|---|
| 4.5 | 172 |
| 4.6 | 162 |
| 4.7 | 153 |
| 4.8 | 143 |
| 4.9 | 133 |
| 5.0 | 124 |
| 5.1 | 114 |
| 5.2 | 104 |
| 5.3 | 95 |
| 5.4 | 85 |
| 5.5 | 75 |

IMAGE FORMING APPARATUS INCLUDING DISTANCE DETECTION UNIT

BACKGROUND OF THE INVENTION

1. Field of the Invention

The present invention relates to an image forming apparatus such as a printer, copier, facsimile machine, or the like, and relates particularly to the correction of density and color misregistration of toner images in the image forming apparatus.

2. Description of the Related Art

Recently, following the rapid shift from monochrome inkjet printers to color inkjet printers, electrophotographic image forming apparatuses (copiers, printers) also have been shifting from monochrome machines to color machines. Some of the color machines are of the tandem type that forms a monochromatic toner image for each color on respective drums and successively transfers the monochromatic toner images onto an image carrier, thereby recording a color image. Meanwhile, some of the color machines are of the single drum type that repeats the process of forming a monochromatic toner image on a drum and transferring each monochromatic image onto an image carrier the same number of times as there are colors, thereby recording a color image. Although the tandem type is inferior to the single drum type in terms of size reduction and cost, the tandem type can form images of respective colors independently (perform image formation in a single pass) and is therefore suitable for faster operation. Accordingly, the tandem color image forming apparatuses, which can achieve an image forming speed equivalent to that of the monochrome machines, have recently been receiving significant attention.

When toner images are successively transferred onto the image carrier in the tandem type, some apparatuses use a method of temporarily forming a color image on an intermediate transfer belt serving as an image carrier and then transferring the color image onto a recording medium serving as an image carrier. In this method, in order to perform density correction or color misregistration correction, a pattern for correction is formed on the intermediate transfer belt and detected by a patch detection sensor. Conventionally, however, when correction is performed by this method, it is difficult to increase the detection accuracy because the output of the patch detection sensor that has detected the correction patch varies under the influence of unevenness of drive of a driving motor that rotates the intermediate transfer belt or a gear, flutter of the intermediate transfer belt, or the like. In order to prevent the flutter of the intermediate transfer belt, it has been suggested that a backup roller be provided on the reverse side of a portion detected by the patch detection sensor, as shown in FIG. 12. Furthermore, as shown in FIG. 13, some apparatuses have a configuration in which the patch detection sensor is disposed in a position facing, for example, the driving roller of the intermediate transfer belt so as to reduce the influence of flutter of the intermediate transfer belt. Moreover, a technique of forming the patch detection sensor and a plate for calibration from the same material and thus increasing the positional accuracy of the patch detection sensor and the calibration plate has been proposed (Japanese Patent Laid-Open No. 11-237773).

In the conventional technique of providing the backup roller, there is the risk that the lifetime of the intermediate transfer belt will be affected. In the case where the patch detection sensor is disposed in a position facing the driving roller of the intermediate transfer belt, since the diameter of the roller also has been decreased with reduction in the size of the apparatuses, a slight misalignment will cause the reflection light to be eclipsed, and consequently a sufficient output cannot be obtained. Moreover, the need for fine adjustment during assembly of the apparatuses causes an increase in the assembly cost and also requires time for adjustment. Reflective optical sensors have a characteristic of being sensitive to angular displacement, as shown in FIG. 14, and thus it is undesirable to dispose the sensor in a position facing the roller, which has a curved surface. Moreover, the technique of Japanese Patent Laid-Open No. 11-237773 is ineffective when a patch on the intermediate transfer belt is read.

SUMMARY OF THE INVENTION

The present invention was conceived in consideration of the circumstances described above, and it is an object thereof to provide an image forming apparatus that can correct color misregistration and density with high precision regardless of unevenness of drive or flutter of the image carrier (the intermediate transfer belt) and that causes less image deterioration.

According to the present invention, for example, an image forming apparatus in which toner images formed by a plurality of image forming units successively arranged in a line are transferred onto an image carrier moving along the plurality of image forming units includes an image information detection unit having a light emitting portion that irradiates the image carrier and the toner images transferred onto the image carrier with light and a light receiving portion that receives reflected light resulting from the light irradiated by the light emitting portion being reflected from the image carrier and the toner images, the image information detection unit detecting image information of the toner images, a distance detection unit that detects distance information regarding the distance between the light receiving portion of the image information detection unit and the surface of the image carrier facing the light receiving portion of the image information detection unit, and a control unit that controls the density of toner images formed by the image forming units based on the image information detected by the image information detection unit and the distance information detected by the distance detection unit.

Moreover, an image forming apparatus in which toner images formed by a plurality of image forming units successively arranged in a line are transferred onto an image carrier moving along the plurality of image forming units includes an image information detection unit having a light emitting portion that irradiates the image carrier and the toner images transferred onto the image carrier with light and a light receiving portion that receives reflected light resulting from the light irradiated by the light emitting portion being reflected from the image carrier and the toner images, the image information detection unit detecting image information of the toner images, a distance detection unit that detects distance information regarding the distance between the light emitting portion of the image information detection unit and the surface of the image carrier facing the light receiving portion of the image information detection unit, and a control unit that controls forming positions of toner images formed by the plurality of image forming units based on the image information detected by the image information detection unit and the distance information detected by the distance detection unit.

Further features of the present invention will become apparent from the following description of an exemplary embodiment (with reference to the attached drawings).

BRIEF DESCRIPTION OF THE DRAWINGS

FIG. 9A is a distance-output table of the patch detection sensor.

FIG. 9B is a distance-output table of the distance measurement sensor.

DESCRIPTION OF THE EMBODIMENTS

A preferred embodiment of the present invention will now be described in detail with reference to the drawings. It should be noted that the relative arrangement of the components, the numerical expressions and numerical values set forth in these embodiments do not limit the scope of the present invention unless it is specifically stated otherwise.

Figure 1:
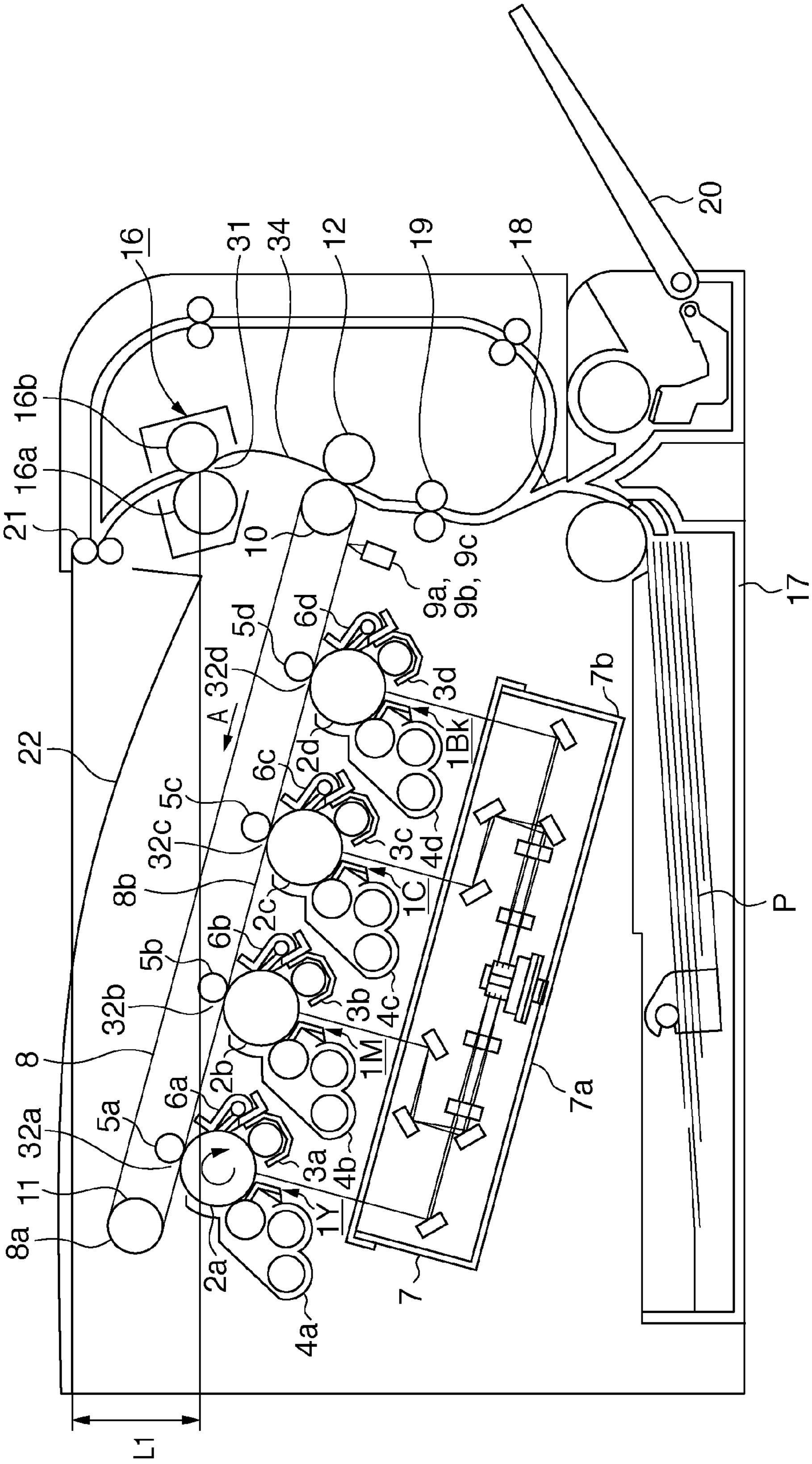
FIG. 1 is a cross-sectional side view showing a configuration of a color image forming apparatus of according to an embodiment of the present invention.

FIG. 1 is a cross-sectional view showing a configuration of a "color image forming apparatus" (a color printer) of Embodiment 1. As shown in FIG. 1, this embodiment is an electrographic tandem color image forming apparatus having an intermediate transfer belt (an intermediate transfer unit) serving as an image carrier. For example, the image forming apparatus is implemented as a printing machine, printer, copier, compound machine, or facsimile machine.

This color image forming apparatus includes an image forming unit 1Y for forming yellow images, an image forming unit 1M for forming magenta images, an image forming unit 1C for forming cyan images, and an image forming unit 1Bk for forming black images. These four image forming units 1Y, 1M, 1C, and 1Bk are arranged in a line with equal space provided between each other (a plurality of image forming units are successively arranged in a line). Furthermore, a paper feed cassette 17 and a manual paper feed tray 20 are disposed below the image forming units; a paper feed guide 18, which is a transport path of a recording medium, is vertically disposed; and a fixing unit 16 is provided above the paper feed guide 18.

Next, individual units will be described in detail. The image forming units 1Y, 1M, 1C, and 1Bk are respectively provided with drum-type electrophotographic photoreceptors (hereinafter referred to as photosensitive drums) 2*a*, 2*b*, 2*c*, and 2*d* serving as image carriers. Around the respective photosensitive drums 2*a*, 2*b*, 2*c*, and 2*d*, there are provided primary chargers 3*a*, 3*b*, 3*c*, and 3*d*, developing devices 4*a*, 4*b*, 4*c*, and 4*d*, transfer rollers 5*a*, 5*b*, 5*c*, and 5*d* serving as transfer units, and drum cleaning devices 6*a*, 6*b*, 6*c*, and 6*d*. A laser exposure system 7 is provided under gaps between the primary chargers 3*a*, 3*b*, 3*c*, and 3*d* and the developing devices 4*a*, 4*b*, 4*c*, and 4*d*.

Each of the photosensitive drums 2*a*, 2*b*, 2*c*, and 2*d* is a negatively charged OPC photoreceptor having a photoconductive layer on a drum base body made of aluminum, and is rotated by a drive (not shown) in the direction of the arrow (the clockwise direction) at a predetermined process speed. The primary chargers 3*a*, 3*b*, 3*c*, and 3*c* serving as primary charging units uniformly charge the surface of the photosensitive drums 2*a*, 2*b*, 2*c*, and 2*d* to a predetermined potential of negative polarity by a charging bias applied from a charging bias supply (not shown). The laser exposure system 7 disposed under the photosensitive drums is configured of a laser beam emitting unit that emits a laser beam in accordance with a time series electric digital pixel signal of given image information, a polygon lens, a reflecting mirror, and the like. Then, by exposing the photosensitive drums 2*a*, 2*b*, 2*c*, and 2*d*, electrostatic latent images of the respective colors corresponding to the image information are formed on the surface of the photosensitive drums 2*a*, 2*b*, 2*c*, and 2*d*, which have been charged by the primary chargers 3*a*, 3*b*, 3*c*, and 3*d*. Details of the configuration of the laser exposure system 7 will be described later.

The developing devices 4*a* to 4*d* contain yellow, magenta, cyan, and black toners, respectively, and cause the toners of the respective colors to adhere to the electrostatic latent images formed on the photosensitive drums 2*a* to 2*d* to develop (visualize) the electrostatic latent images as toner images. The transfer rollers 5*a* to 5*d* serving as primary transfer units are disposed in such a manner that the transfer rollers 5*a* to 5*d* can abut against the photosensitive drums 2*a* to 2*d* via the intermediate transfer belt 8 at primary transfer portions 32*a* to 32*d*, and successively transfer the toner images on the photosensitive drums onto the intermediate transfer belt 8 so that each toner image is superimposed upon the previous toner image. The drum cleaning devices 6*a* to 6*d* are configured of a cleaning blade and the like and clean the surface of the drums by scraping any residual transfer toner that remains on the photosensitive drums 2*a* to 2*d* after the primary transfer off the photosensitive drums 2*a* to 2*d*.

The intermediate transfer belt 8 is disposed on the top face side of the photosensitive drums 2*a* to 2*d*, is extended between a secondary transfer counter-roller 10 and a tension roller 11, and moves in the direction of arrow A. The secondary transfer counter-roller 10 is disposed in such a manner that the secondary transfer counter-roller 10, in a transport guide 34, can abut against a secondary transfer roller 12 via the intermediate transfer belt 8. Moreover, the intermediate transfer belt 8 is made of a dielectric resin such as polycarbonate, polyethylene terephthalate resin film, polyvinylidene fluoride resin film, or the like. The image that has been transferred onto the intermediate transfer belt 8 is transferred onto the recording medium that has been transported from the paper feed cassette 17 by the transport guide 34. A belt cleaning device for removing and collecting any residual transfer toner on the surface of the intermediate transfer belt 8 is provided outside the intermediate transfer belt 8 and in the vicinity of the tension roller 11.

Image formation with each of the toners is performed by the process described above.

A paper feed unit has the paper feed cassette 17 for containing a recording medium P, the manual paper feed tray 20, and pickup rollers (not shown) for sending out the recording medium P one sheet at a time from the inside of the cassette or from the manual paper feed tray. The paper feed unit further has a paper feed roller for transporting the recording medium P that has been sent out by each of the pickup rollers to registration rollers, the paper feed guide 18, and the registration rollers 19 for sending the recording medium P into a secondary transfer area in accordance with the timing of image formation by the image forming units.

The fixing unit 16 includes a fixing film 16*a* provided inside thereof with a heat source such as a ceramic heater substrate and a pressure roller 16*b* (in some cases, this roller may be provided with a heat source) that is pressed against the ceramic heater substrate with the film held therebetween. Moreover, the transport guide 34 for guiding the recording medium P to a nip portion 31 of the pair of rollers, and paper discharge rollers 21 for guiding the recording medium P ejected from the fixing unit 16 to the outside of the apparatus, are provided in front of and behind the fixing unit 16. A control unit includes a control substrate for controlling operations of the mechanisms within the units and a motor drive substrate (not shown).

Figure 2:
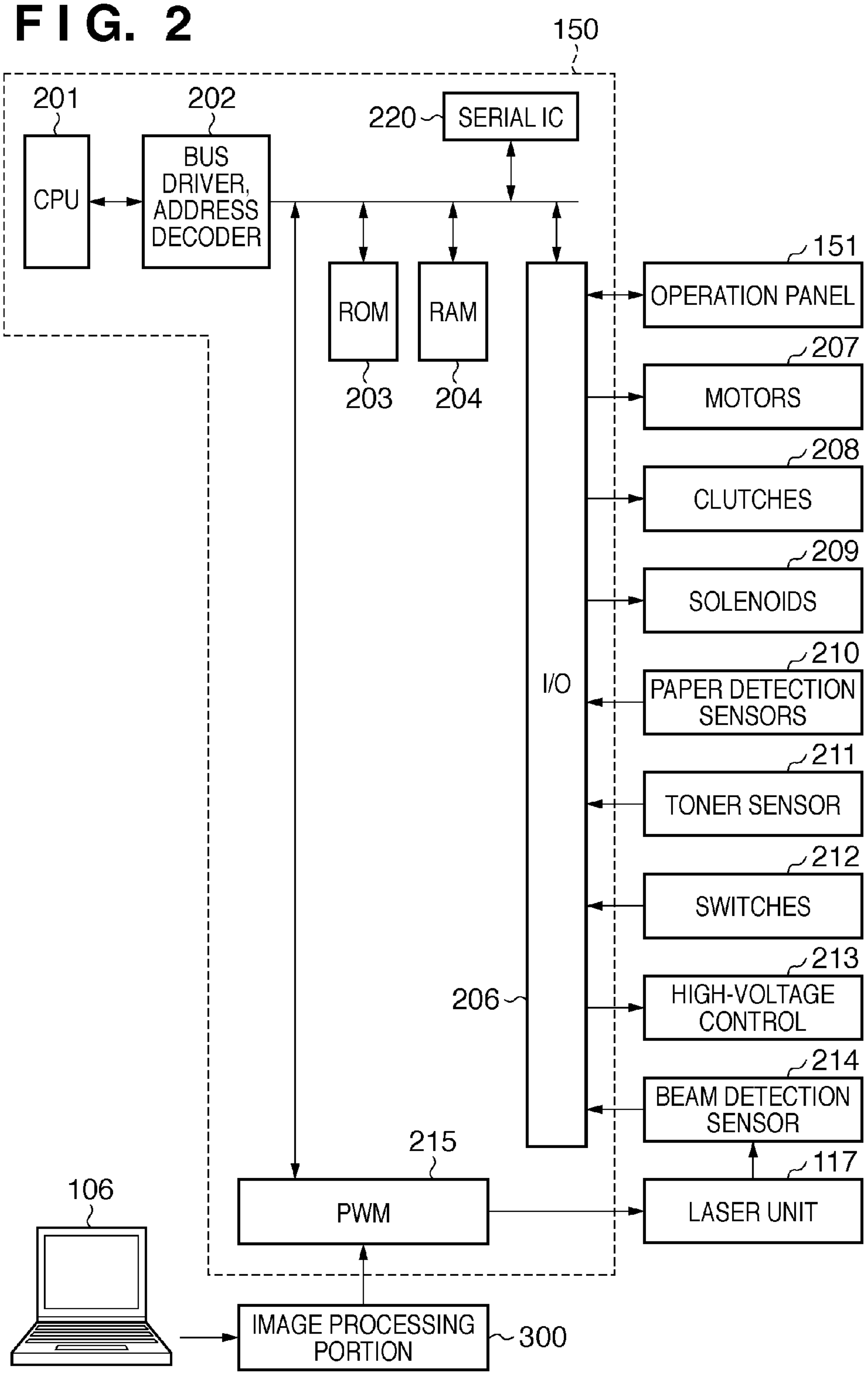
FIG. 2 is a block diagram of an electrical system that conducts control according to an embodiment.

FIG. 2 is a block diagram of a controlling portion 150 and an image processing portion 300.

A CPU 201 for performing control of the entire image forming apparatus reads programs successively from a read only memory 203 (ROM) in which the control procedure (control program) of the apparatus main body is stored, and runs the programs. An address bus and a data bus of the CPU 201 are connected to each load via a bus driver circuit and an address decoder circuit 202. A serial IC unit 220 is also connected to the bus. A random access memory (RAM) 204 is a main storage that is used to store input data and that is used as a working storage or the like.

An I/O interface 206 is connected to an operation panel 151 with which the operator performs key entry and on which the state, for example, of the apparatus is displayed using a liquid crystal or LED display, motors 207 for driving the paper feed system, the transport system, and the optical system, clutches 208, and solenoids 209. Moreover, the I/O interface 206 is connected to various loads of the apparatus, such as detection sensors 210 for detecting the transported recording medium. Toner level sensors 211 for detecting the toner amount in the developing devices are disposed in the developing devices 4*a* to 4*d*, and output signals from the toner level sensors 211 are input into the I/O port 206. Furthermore, signals from switches 212 for detecting the home positions of the loads, the open/closed state of a door, or the like are also input into the I/O port 206. A high-voltage unit 213 outputs a high voltage to the primary chargers, the developing devices, or the like as instructed by the CPU 201.

The image processing portion 300 performs image processing upon input of an image signal from, for example, a personal computer 106 connected to the image processing portion 300, and outputs a control signal for a laser unit 117 according to the image data. A laser beam output from the laser unit 117, which is controlled by a PWM unit 215, is irradiated onto the photosensitive drums 2*a* to 2*d* and exposes the photosensitive drums, and the emitting state is detected by a beam detection sensor 214, which is a light receiving sensor, in a non-image area. Then, an output signal from the beam detection sensor 214 is input into the I/O port 206.

Figure 3:
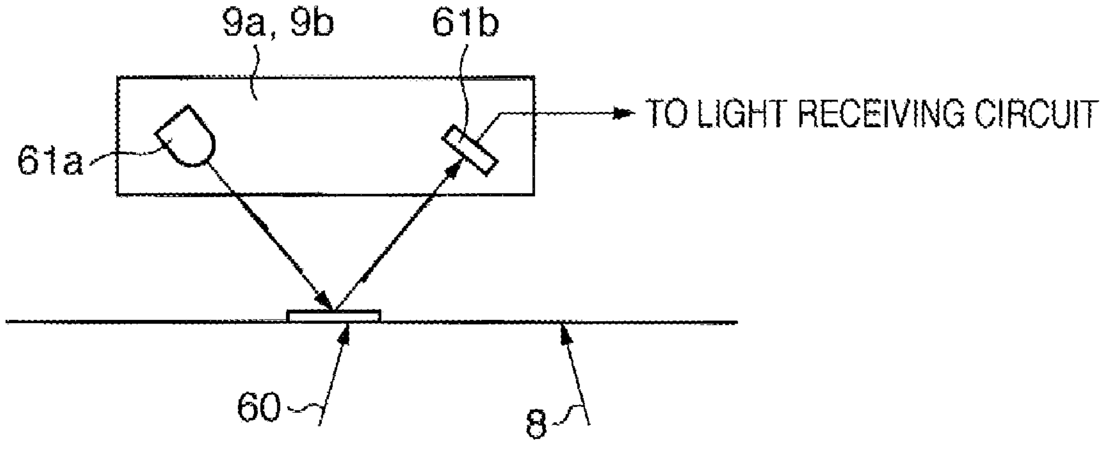
FIG. 3 is a diagram showing a schematic configuration of a color misregistration correction sensor or a path detection sensor.

Here, the density correction (patch detection) will be described. FIG. 3 shows a manner in which photosensors 9*a* and 9*b* detect a density correction patch or an image misregistration detection pattern 60 on the intermediate transfer belt 8. The density correction patch or the image misregistration detection pattern 60 is read by the photosensors 9*a* and 9*b*, each of which is constituted by a light emitting element (a light emitting portion) and a light receiving element (a light receiving portion), such as an LED 61*a* and a phototransistor 61*b*. For example, the sensor 9*a* is used both for registration detection and patch detection, and performs control using only specular reflection light during registration detection and performs control using diffuse reflection light together with specular reflection light during patch detection. Moreover, the sensor 9*b* is dedicated to registration detection, and is used during registration detection together with the sensor 9*a* and performs control using only specular reflection light. Two pairs of the photosensors 9*a* and 9*b* are disposed in a direction orthogonal to the process direction with a predetermined distance provided therebetween, and the density correction patch or the image misregistration detection pattern 60 is also formed to pass over the photosensors 9*a* and 9*b*.

It should be noted that a material having a high reflectance of light (e.g., infrared light) irradiated by the LED 61*a* serving as the light emitting element in the photosensor 9*a* or 9*b* compared to the reflectance of the density correction patch or the image misregistration detection pattern 60 is used as the intermediate transfer belt 8. Due to this difference in the reflectance, pattern detection of the image misregistration detection pattern 60 can be achieved.

Figure 4:
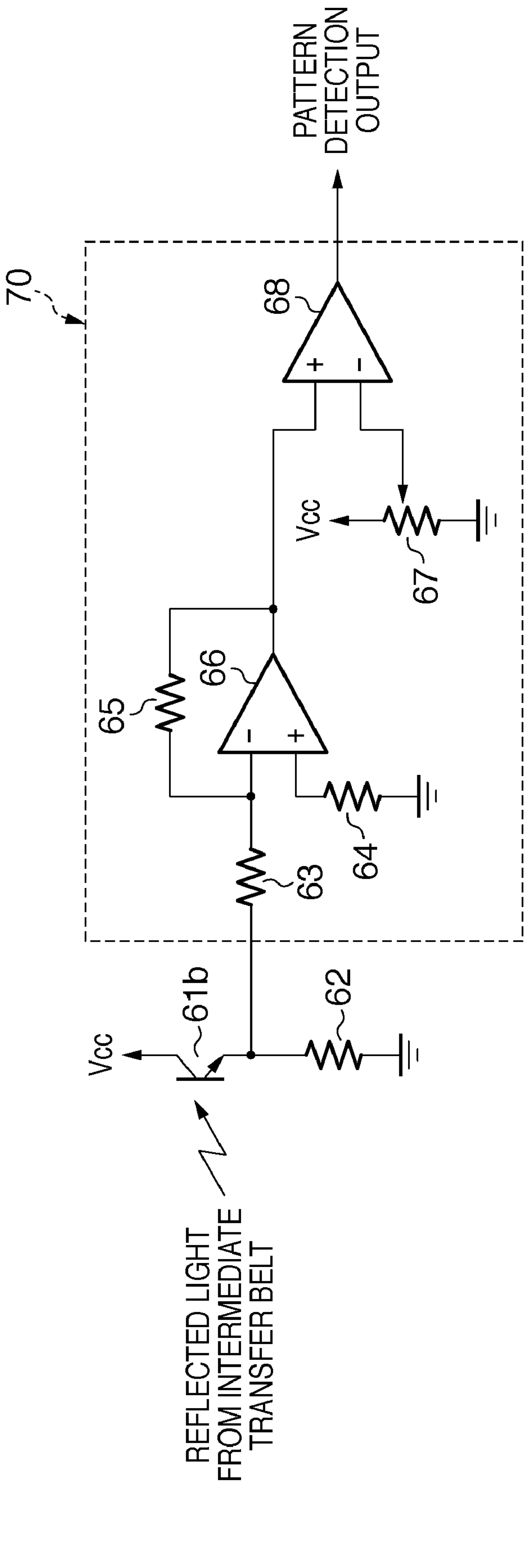
FIG. 4 is a diagram showing a light receiving circuit of the color misregistration correction sensor.

FIG. 4 shows a light receiving circuit 70. Light emitted from the LED 61*a* is reflected by the density correction patch or the image misregistration detection pattern 60 and the intermediate transfer belt 8, and the phototransistor 61*b* (an image information detection unit) serving as the light receiving element receives the reflected light and outputs a signal. The light receiving circuit 70 converts the output signal into an electric signal.

In FIGS. 3 and 4, when a section of the intermediate transfer belt 8 is detected by the photosensors 9*a* and 9*b* (see FIG. 1), a large amount of photocurrent passes through the phototransistor 61*b* due to a large quantity of reflected light. The photocurrent is subjected to current/voltage conversion by a resistor 62 and amplified by resistors 63, 64, and 65 and an operational amplifier 66 and amplifier 68 which is coupled to resistor 67.

On the other hand, when the density correction patch or the image misregistration detection pattern 60 is detected by the photosensors 9*a* and 9*b*, a small amount of photocurrent compared to that of the section of the intermediate transfer belt 8 passes through the phototransistor 61*b* due to a small quantity of reflected light. The photocurrent is similarly subjected to current/voltage conversion by the resistor 62 and amplified by the resistors 63, 64, and 65 and the operational amplifier 66.

Figure 5A:
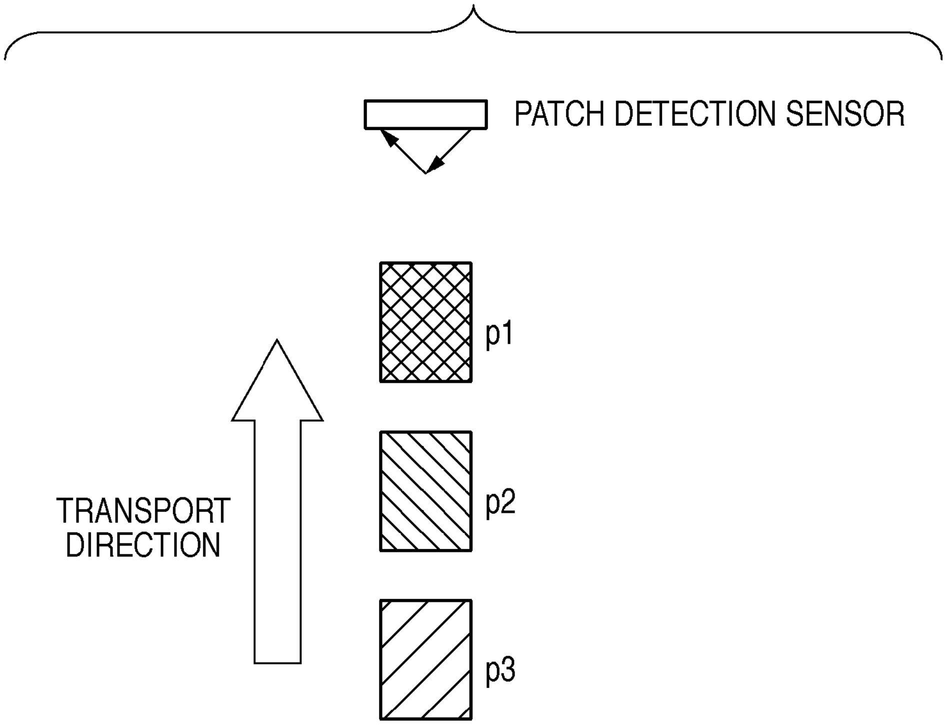
FIG. 5A is a diagram showing a patch detection pattern.
Figure 5B:
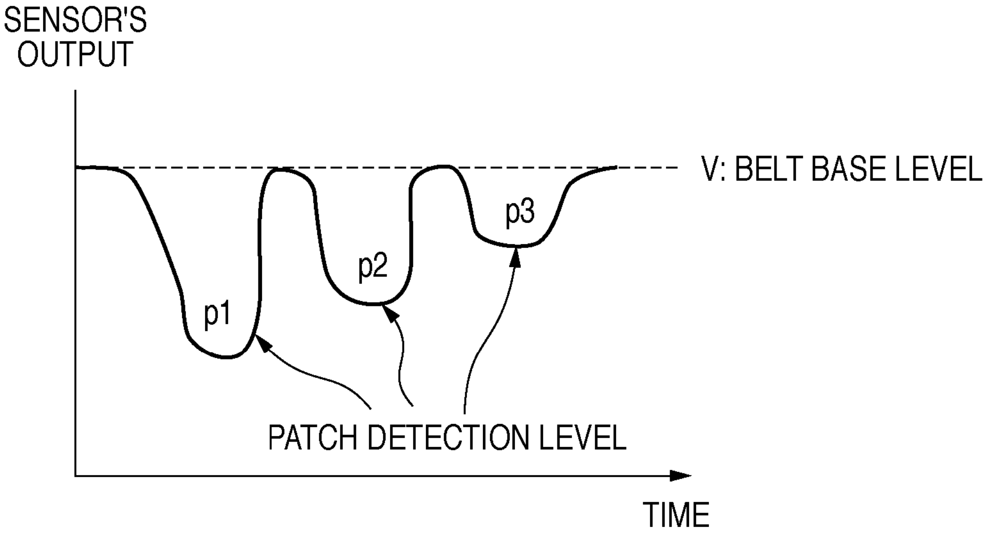
FIG. 5B is a graph showing a detection waveform of the patch detection pattern.
Figure 6:
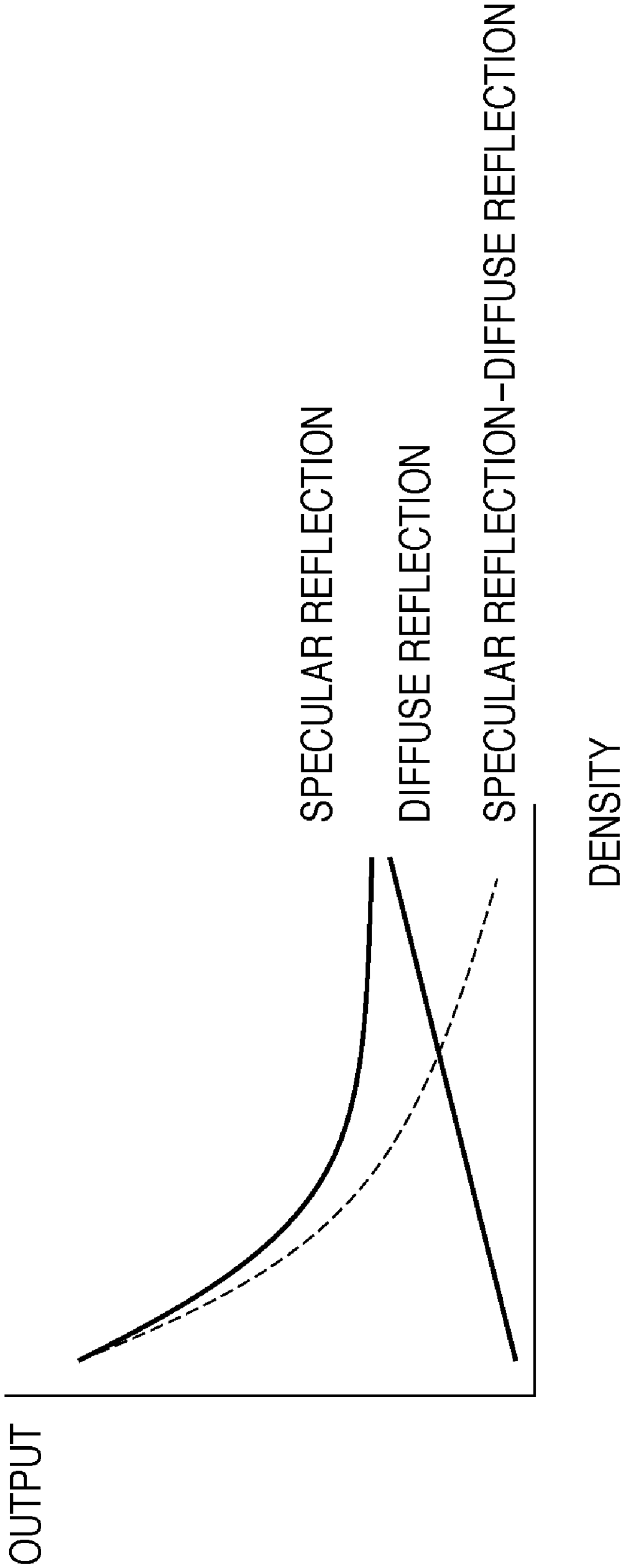
FIG. 6 is a graph showing output characteristics of the patch detection sensor.

FIGS. 5A, 5B, and 6 illustrate a manner in which density correction patches are formed on the intermediate transfer belt 8 and detected. When density correction patches p1 to p3 are formed (FIG. 5A) on the intermediate transfer belt 8 and detected by a patch detection sensor, a waveform as shown in FIG. 5B is obtained due to differences in the reflectance between the intermediate transfer belt and the toner patch portions. The sensor's output is large during detection of the surface of the intermediate transfer belt 8, and the sensor's output is small during detection of the toner patches. Due to the difference in the density among the toner patches, the detection level when the patches p1 to p3 are read varies from patch to patch, which results in a waveform in which the dynamic range between the detection level of the patches and that of the base of the belt decreases gradually.

Here, the relationship between the patch density and the detection level of the sensor will be described by means of FIG. 6. When the patch density is low, reflected light from the base of the belt still has a large influence, so that the sensor's detection output is also large. When the patch density increases, the influence of the base of the belt decreases, so that the output becomes small. As a result, a curve of specular reflection as shown in FIG. 6 is obtained. However, depending on the characteristics of the sensors, significant change in the output may not be obtained on the high density side. In that case, a technique in which characteristics as shown by the dotted line are created through the use of the characteristics of diffuse reflection is also adopted and used to perform control. The characteristics as shown in FIG. 6 are measured in advance at the research stage and stored in the RAM 204 as a table for density correction. Then, the detection output is compared to the table, and a difference between the density that has been read and the density to be actually produced is calculated and fed back to the amount of toner supply, the laser beam quantity, the transfer current, and the like (image forming conditions), and thus density correction is performed.

Figure 7A:
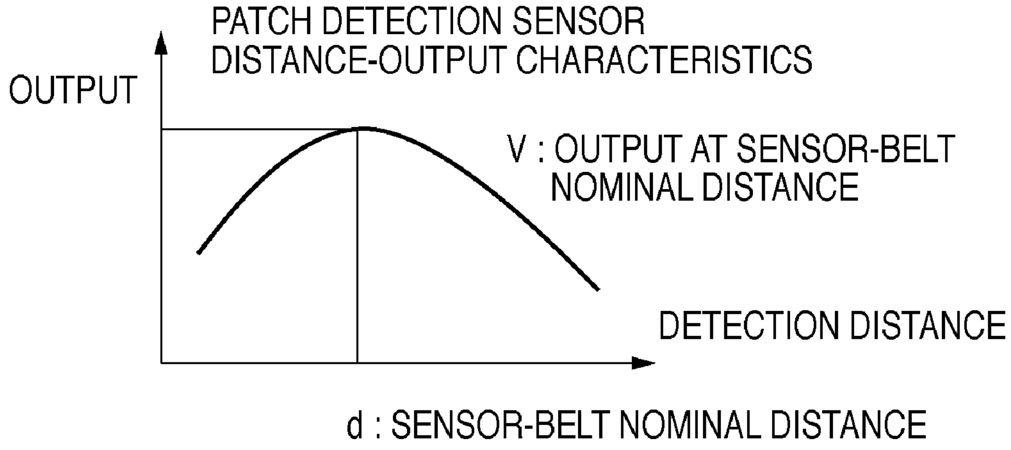
FIG. 7A is a graph showing distance characteristics of the patch detection sensor.
Figure 7B:
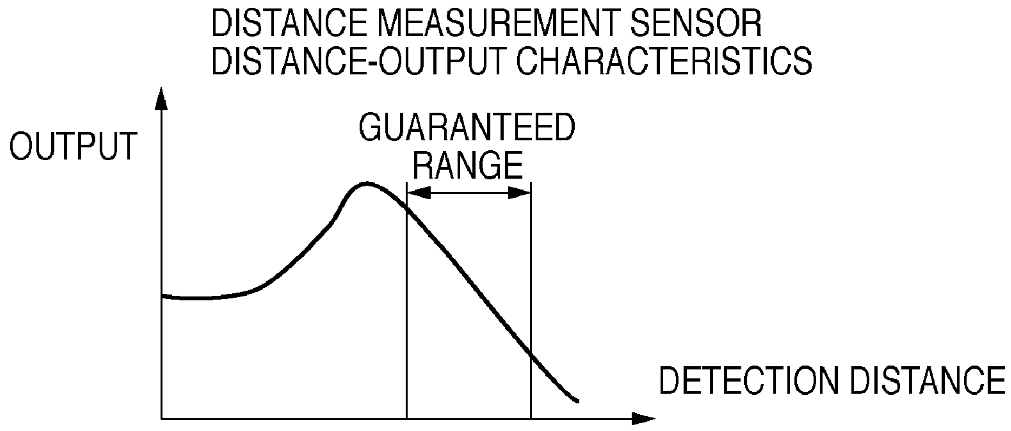
FIG. 7B is a graph showing distance characteristics of a distance measurement sensor.

However, in the actual pattern detection output, due to unevenness of drive and flutter of the intermediate transfer belt 8, the sensor's detection output also becomes uneven, as shown in FIGS. 7A and 7B. In order to perform color misregistration correction and density correction with high precision, it is necessary to minimize such output unevenness. Accordingly, in this embodiment, a configuration as described below is adopted and used to perform control in order to reduce the output unevenness.

Figure 8:
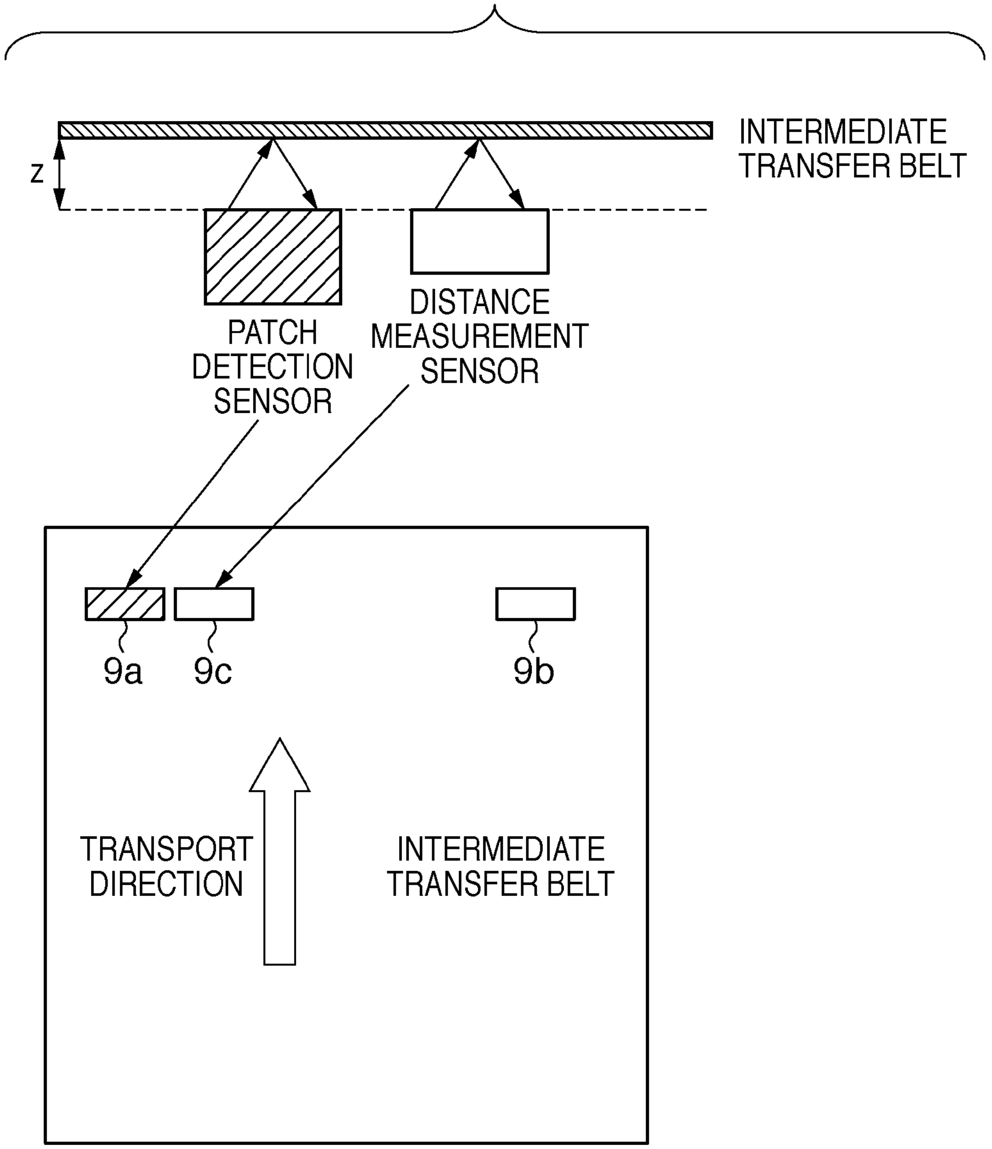
FIG. 8 is a diagram showing an arrangement of the patch detection sensor and the distance measurement sensor.

First, as shown in FIG. 8, a distance measurement sensor 9*c* (a distance detection unit) for measuring the flutter of the surface of the intermediate transfer belt in the direction z is disposed in the vicinity of a patch detection sensor. For the purpose of measuring the influence of unevenness of drive and flutter of the intermediate transfer belt, it is necessary to dispose the distance measurement sensor 9*c* in such a manner that, as shown in FIG. 8, the distance measurement sensor 9*c* and the patch detection sensor are arranged in a line in a direction perpendicular (substantially perpendicular) to the transport direction of the intermediate transfer belt. Moreover, in order to measure the distance between the surface of the intermediate transfer belt and the surface of the patch detection sensor, a technique of disposing the distance measurement sensor 9*c* so that the surface of the patch detection sensor and the surface of the distance measurement sensor 9*c* are coplanar can first be considered. However, since it is only necessary to detect a change in the distance (distance information), the same effect can be obtained even when the distance measurement sensor 9*c* is disposed in a position that maximizes the sensitivity of the distance measurement sensor 9*c*. For example, when the output of the patch detection sensor reaches a peak at 6 mm and the distance sensitivity of the distance measurement sensor 9*c* is maximized at 5 mm, the patch detection sensor and the distance measurement sensor 9*c* can be disposed at distances 6 mm and 5 mm, respectively, from the surface of the intermediate transfer belt. Regarding the reference distance of the distance measurement sensor 9*c*, the mechanical dimension of the mounting position, which is 5 mm in this embodiment, can be used as the reference to detect the flutter of the intermediate transfer belt during a patch detection sequence. However, when the presence of mechanical tolerance is taken into account, the output of the patch detection sensor can be corrected more precisely by using the distance from the intermediate transfer belt at rest as the reference (a reference value) and detecting the swing (a displacement relative to the reference value) of the intermediate transfer belt in the direction z during patch detection. Although the displacement relative to the reference value was used here as the distance information to be detected by the distance detection unit, it should be noted that the distance from the surface of the image carrier may be directly detected instead.

Furthermore, when the patch detection sensor and the distance measurement sensor 9*c* are configured as a single unit, it is no longer necessary to take care about the accuracy of the mounting positions of these sensors.

Next, the control method will be described. The characteristics of specular reflection light of the patch detection sensor with respect to distance are represented by a curve as shown in FIG. 7A in which the output reaches a peak at a certain distance and is small at distances too close to and too far from the intermediate transfer belt. On the other hand, the output characteristics of the distance measurement sensor 9*c* with respect to distance are as shown in FIG. 7B, and the use of the distance measurement sensor 9*c* within the range in which the relationship between the output and the distance is linear is guaranteed. In order to use these characteristics to perform correction, the characteristics of each of these sensors with respect to distance are stored beforehand in the RAM in the form of tables. During a density correction sequence, the distance from the intermediate transfer belt is determined based on the output of the distance measurement sensor 9*c* and the stored table (FIG. 9B), the amount of difference between the output value of the patch detection sensor at the determined distance and the current output value is determined, and the correction is carried out.

Figure 10:
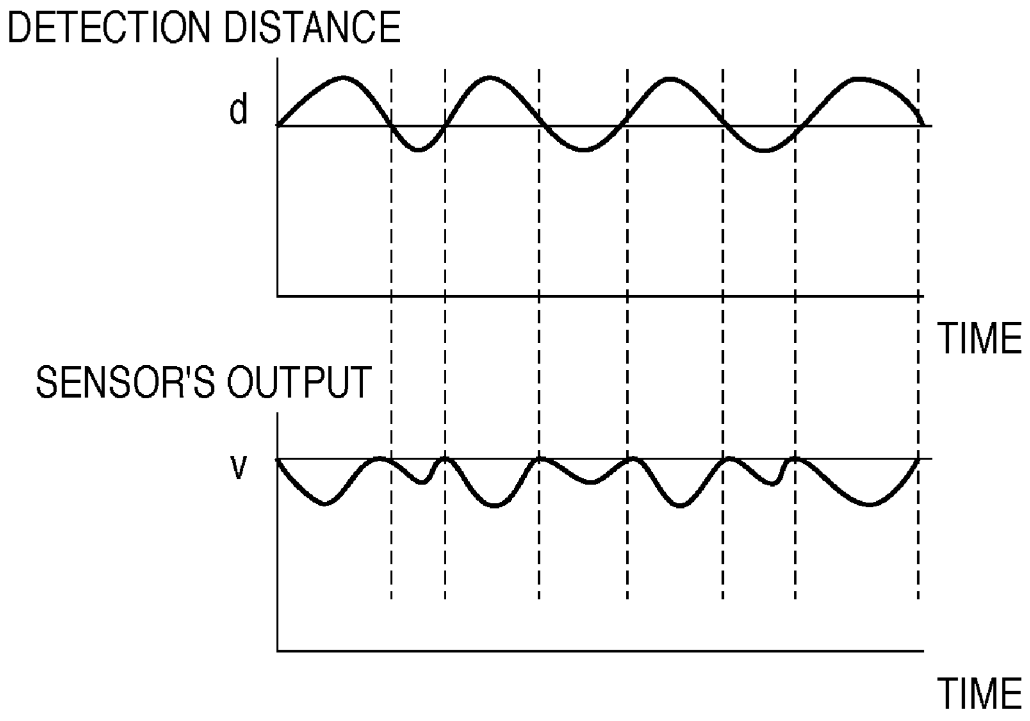
FIG. 10 is a diagram showing a state in which an output of the patch detection sensor is corrected based on a detection result of the distance measurement sensor.

This will be described more specifically. FIGS. 9A and 9B show distance-output tables in the case where the output of the patch detection sensor peaks at 6 mm and the output of the distance measurement sensor 9*c* peaks at 5 mm. The output of the patch detection sensor in this case represents the characteristics at the time when reflected light from the belt base portion or a given reference plate is detected. For example, when the output of the distance measurement sensor 9*c* is "143", the actual distance is 4.8 mm, which means that the distance measurement sensor is in a position closer to the intermediate transfer belt than the mechanical nominal position by 0.2 mm (distance information), and accordingly, the row with "5.8 (mm)" in the output table of the patch detection sensor can be used. Then, the output is corrected to a value determined by calculation V*(139/134) where the output of the patch detection sensor is V. In this manner, as shown in FIG. 10, stable output (corrected image information) of the patch detection sensor can be obtained even when the distance changes. Moreover, the patch detection sensor generally is disposed at a peak detection distance at which a maximum output can be obtained. However, as is the case with the distance measurement sensor 9*c*, by intentionally using a region in which the output monotonically decreases with respect to distance, the circuit can be implemented as hardware, and the output of the patch detection sensor can be corrected without the need for control by software. In this case, however, it is necessary that a reduction in the dynamic range be taken into account.

Figure 11:
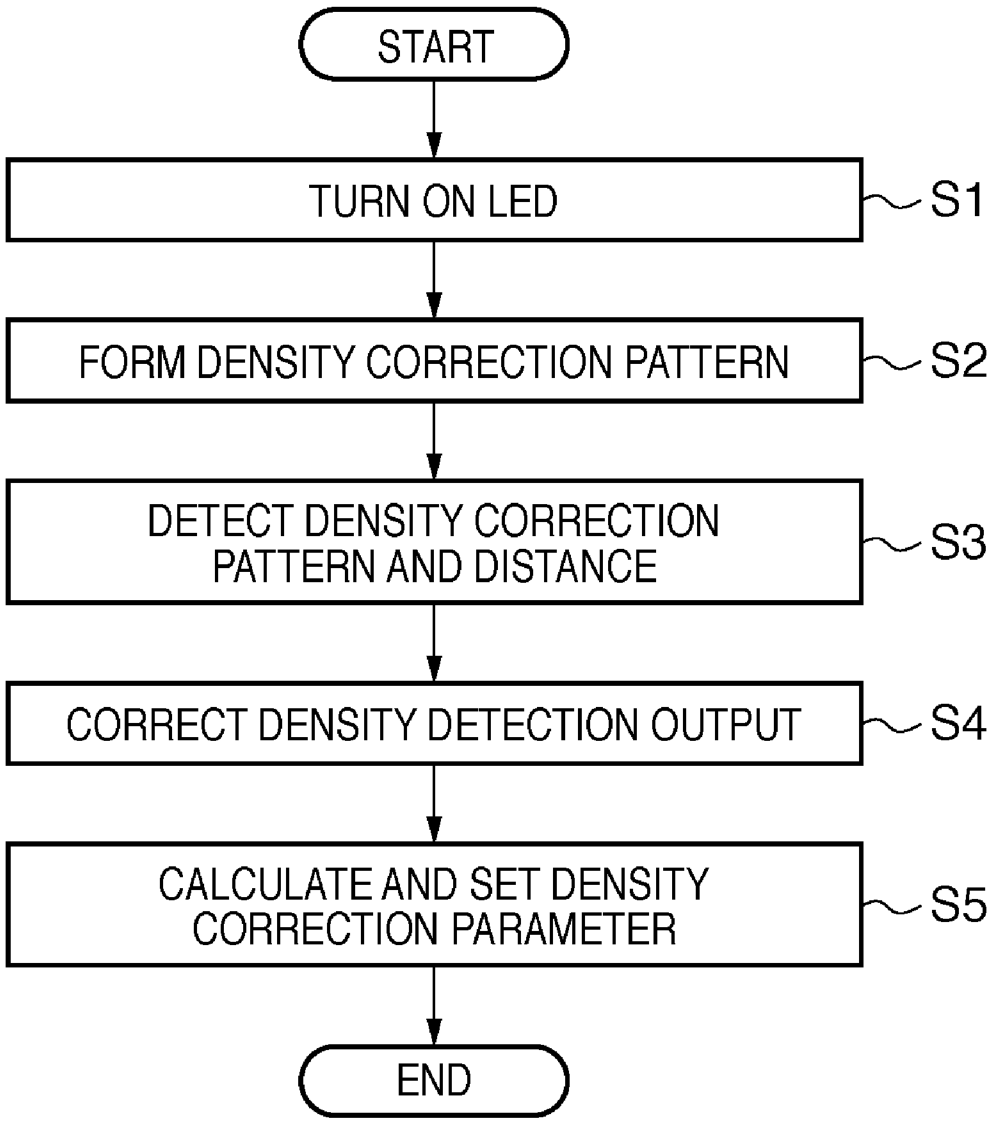
FIG. 11 is a flowchart showing a density correction control sequence.
Figure 12:
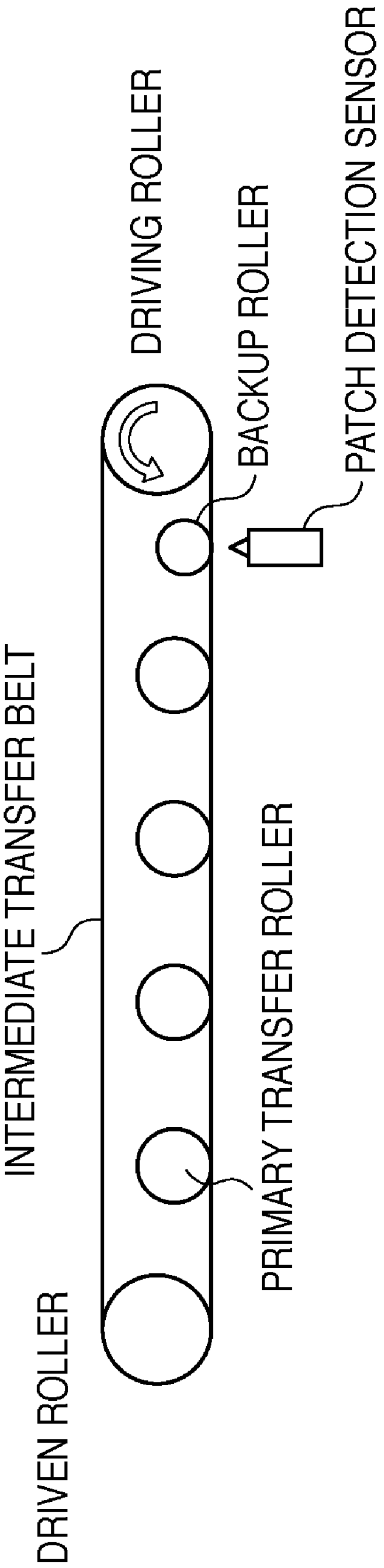
FIG. 12 is a diagram showing the relationship between a patch detection sensor and a backup roller.
Figure 13:
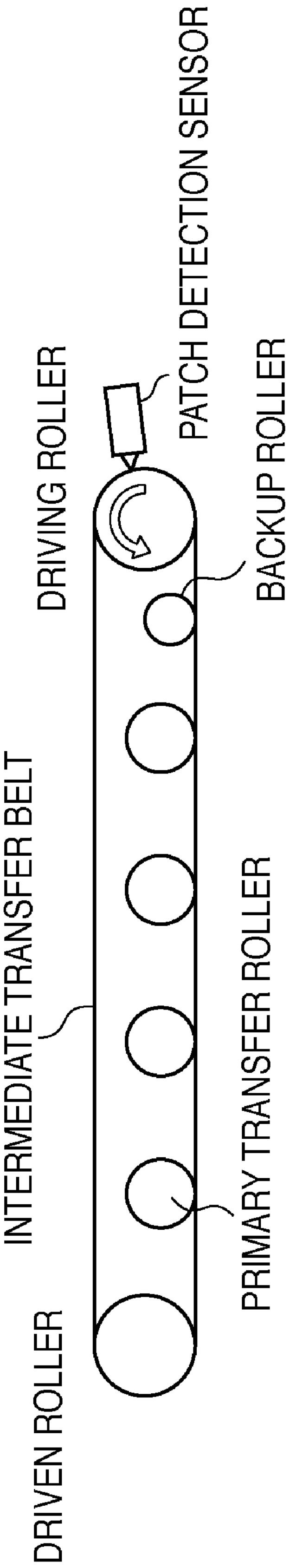
FIG. 13 is a diagram showing a state in which a patch detection sensor is disposed facing a roller for driving an intermediate transfer belt.
Figure 14A:
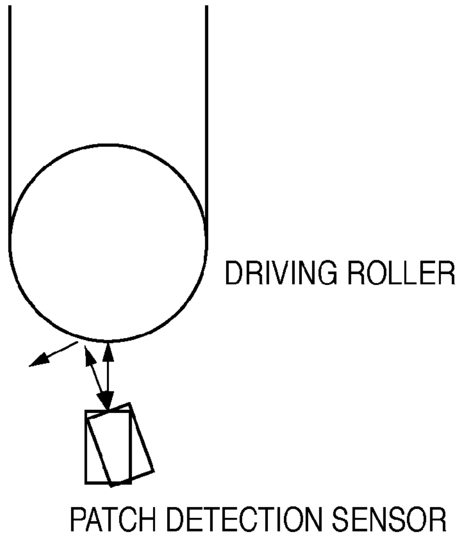
FIG. 14A is an explanatory diagram of a reflective sensor.
Figure 14B:
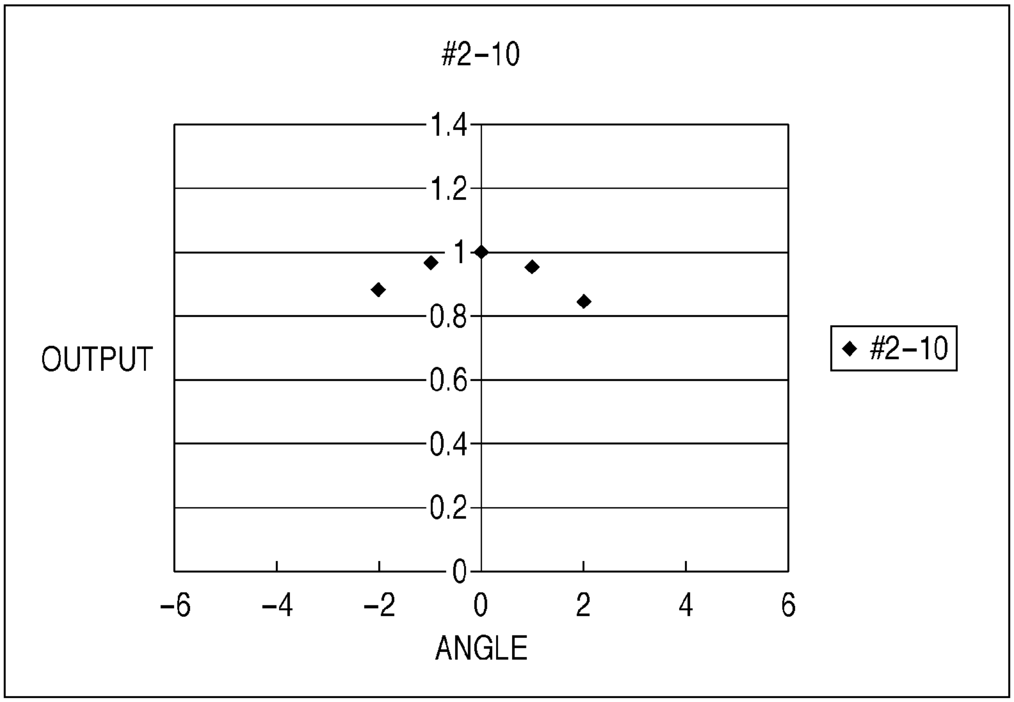
FIG. 14B is an explanatory diagram of angular characteristics of the reflective sensor.

Next, a density correction control sequence of this embodiment will be described using the flowchart in FIG. 11. The process of this flowchart is performed by the CPU 201.

First, when the density correction control is started, LEDs of the photosensors 9*a* and 9*b* are turned on in step S1. Then, a pattern for density correction is formed in step S2, and in step S3, the pattern is detected using the photosensors 9*a* and 9*b*, and at the same time, the distance from the intermediate transfer belt is measured by the distance measurement sensor 9*c*. After the density correction pattern is detected, control for correcting the detected data is performed as shown in step S4, and various parameters for density correction are calculated and set in step S5 based on the corrected data, and thus the density correction control is completed.

Next, image forming operations of this color image forming apparatus will be described. When an image formation start signal is supplied from, for example, a personal computer connected to this image forming apparatus or an operating portion (not shown) for the purpose of performing copying operations, a paper feed operation is started from the paper feed cassette 17 or the manual paper feed tray 20 selected. For example, a case where paper is fed from the cassette will be described. First, a transfer material P is sent out from the paper feed cassette 17 one sheet at a time by the pickup roller. Then, the recording medium P is guided through the paper feed guide 18 and transported to the registration rollers 19. At that time, the registration rollers 19 are at rest, and the front end of paper comes into contact with the nip portion of the registration rollers 19. Subsequently, the registration rollers 19 start to rotate based on a timing signal by which the image forming units start image formation. This rotation timing is set in such a manner that the recording medium P and toner images that have been primarily transferred onto the intermediate transfer belt 8 by the image forming units exactly coincide with each other in the secondary transfer area.

On the other hand, in the image forming units, when the image forming operation start signal is supplied, electrostatic latent images are formed on the drums of the respective colors. The timing of image formation in the sub-scanning direction is determined in accordance with the distance between the image forming units in order from the photosensitive drum (Y in this embodiment) furthest upstream in the rotating direction of the intermediate transfer belt 8. Moreover, regarding the write timing in the main scanning direction of each drum, a pseudo-BD sensor signal is generated using a single BD sensor signal (disposed in BK in this embodiment) by circuit operation, which is not shown, and is used to perform control. At this time, a latent image that has been corrected for the misregistration among the colors and the differences in main scan magnification by a correction operation, which will be described later, is formed. The electrostatic latent image thus formed is developed by the above-described process. Then, the toner image that has been formed on the photosensitive drum 2*a* furthest upstream is primarily transferred onto the intermediate transfer belt 8 in a primary transfer area by the transfer roller (the primary transfer unit) 5*a* to which a high voltage is applied. The primarily transferred toner image is transported to the subsequent transfer roller 5*b*. Image formation is performed there with a delay equal to the toner image transport time between the image forming units based on the above-described timing signal, so that the subsequent toner image is transferred on top of and in registration with the preceding image. The same process is repeated thereafter, and ultimately, the toner images of the four colors are primarily transferred onto the intermediate transfer belt 8.

Then, when the recording medium P enters the secondary transfer area (the secondary transfer roller 12) and makes contact with the intermediate transfer belt 8, a high voltage is applied to the secondary transfer roller 12 in timing with passage of the recording medium P. Then, the toner images of the four colors that have been formed on the intermediate transfer belt 8 by the above-described process are transferred onto the surface of the recording medium P. After the secondary transfer, the recording medium P is accurately guided to the nip portion of the fixing rollers by the transport guide 34. The toner images are fixed to the surface of the recording medium P by heat and by nip pressure of the fixing film 16*a* and the pressure roller 16*b*. Subsequently, the recording medium P is transported by the paper discharge rollers 21 and discharged to the outside of the apparatus, and thus a series of image forming operations is completed.

In this embodiment, the image forming units are arranged in the order of yellow, magenta, cyan, and black from the upstream side. However, the order of arrangement is determined by the characteristics of the apparatus and is not limited to this.

As described above, according to this embodiment, variations in the output of the patch detection sensor due to unevenness of drive or flutter of the intermediate transfer belt can be corrected by using the distance measurement sensor. Thus, an image forming apparatus that can correct color misregistration (misregistration of toner image forming positions) and density with high precision and that causes less image deterioration can be provided.

While the present invention has been described with reference to an exemplary embodiment, it is to be understood that the invention is not limited to the disclosed exemplary embodiment. The scope of the following claims is to be accorded the broadest interpretation so as to encompass all such modifications and equivalent structures and functions.

This application claims the benefit of Japanese Patent Application No. 2007-205509, filed Aug. 7, 2007 which is hereby incorporated by reference herein in its entirety.

What is claimed is:

1. An image forming apparatus comprising:

a plurality of image forming units which form toner images;

an image carrier which moves along said plurality of image forming units and onto which the toner images formed by said image forming units are transferred;

an image information detection unit comprising a light emitting portion which irradiates said image carrier and the toner images transferred onto said image carrier with light and a light receiving portion which receives reflected light resulting from the light irradiated by the light emitting portion being reflected from said image carrier and the toner images, said image information detection unit detecting image information of the toner images;

a distance detection unit which detects distance information regarding the distance between the light receiving portion of said image information detection unit and the surface of said image carrier facing said image information detection unit; and a control unit which controls the density of toner images formed by said image forming units based on the image information detected by said image information detection unit and the distance information detected by said distance detection unit.

2. The image forming apparatus according to claim 1, wherein said control unit further comprises:

a unit which corrects the image information detected by said image information detection unit based on the distance information detected by said distance detection unit; and a unit which controls the density of the toner images based on the corrected image information.

3. The image forming apparatus according to claim 1, wherein the distance information is the distance between the light receiving portion of said image information detection unit and the surface of said image carrier facing the light receiving portion of said image information detection unit.

4. The image forming apparatus according to claim 1, wherein the image information is a displacement relative to a reference value of the distance between the light receiving portion of said image information detection unit and the surface of said image carrier facing the light receiving portion of said image information detection unit.

5. The image forming apparatus according to claim 1, wherein said image information detection unit and said distance detection unit are arranged in a line in a direction substantially perpendicular to a transport direction of said image carrier.

6. The image forming apparatus according to claim 1, wherein said image information detection unit and said distance detection unit are formed as a single unit.

7. The image forming apparatus according to claim 1, wherein said image carrier is an intermediate transfer belt.

8. An image forming apparatus comprising:

a plurality of image forming units which form toner images;

an image carrier which moves along said plurality of image forming units and onto which the toner images formed by said image forming units are transferred;

an image information detection unit comprising a light emitting portion which irradiates said image carrier and the toner images transferred onto said image carrier with light and a light receiving portion which receives reflected light resulting from the light irradiated by said light emitting portion being reflected from said image carrier and the toner images, said image information detection unit detecting image information of the toner images;

a distance detection unit which detects distance information regarding the distance between the light emitting portion of said image information detection unit and the surface of said image carrier facing the light receiving portion of said image information detection unit; and a control unit which controls forming positions of toner images formed by said plurality of image forming units based on the image information detected by said image information detection unit and the distance information detected by said distance detection unit.

9. The image forming apparatus according to claim 8, wherein the distance information is the distance between the light receiving portion of said image information detection unit and the surface of said image carrier facing the light receiving portion of said image information detection unit.

10. The image forming apparatus according to claim 8, wherein the distance information is a displacement relative to a reference value of the distance between the light receiving portion of said image information detection unit and the surface of said image carrier facing the light receiving portion of said image information detection unit.

11. The image forming apparatus according to claim 8, wherein said image information detection unit and said distance detection unit are formed as a single unit.

12. The image forming apparatus according to claim 8, wherein said image carrier is an intermediate transfer belt.

13. An image forming apparatus comprising:

an image carrier;

an image forming unit configured to form toner image on the image carrier;

an first detection unit comprising a light emitting portion configured to irradiate the image carrier and the toner image transferred onto the image carrier with light, and a light receiving portion configured to receive a light reflected from the image carrier or the toner image;

a second detection unit configured to detect distance between the first detection unit and the surface of the image carrier facing the first detection unit; and a control unit configured to control the density of toner image formed by the image forming unit based on a detection result of the first detection unit and the distance detected by the second detection unit.

14. The image forming apparatus according to claim 13, wherein the light receiving portion outputs a signal corresponding to an amount of the light reflected from the image carrier or the toner image, and wherein the control unit corrects the signal based on the distance, and controls the density of toner image based on the corrected signal.

15. An image forming apparatus comprising:

an image carrier;

a plurality of image forming units which form toner images on the image carrier;

an image first detecting unit comprising a light emitting portion configured to irradiate the image carrier and the toner images transferred onto the image carrier with light and a light receiving portion configured to receive a light reflected from said image carrier or the toner images;

a second detection unit configured to detect distance between the first detection unit and the surface of the image carrier facing the light receiving portion of the first detection unit; and a control unit configured to control forming position of toner image formed by at least an image forming unit of the plurality of image forming units based on a detection result of the first detection unit and the distance detected by the second detection unit.

* * * * *